United States Patent
Cunningham et al.

(10) Patent No.: US 11,085,333 B2
(45) Date of Patent: Aug. 10, 2021

(54) EXHAUST MIXER WITH OFFSET LOBES

(71) Applicant: Pratt & Whitney Canada Corp., Longueuil (CA)

(72) Inventors: Mark Cunningham, Montreal (CA); Remo Marini, Montreal (CA); Sami Girgis, Montreal (CA); Mohammad Reza Kameshki, Toronto (CA); Raja Ramamurthy, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 932 days.

(21) Appl. No.: 13/937,587

(22) Filed: Jul. 9, 2013

(65) Prior Publication Data
US 2015/0013341 A1    Jan. 15, 2015

(51) Int. Cl.
F02K 1/48    (2006.01)
F01D 25/30   (2006.01)
F02K 1/38    (2006.01)

(52) U.S. Cl.
CPC .............. *F01D 25/30* (2013.01); *F02K 1/386* (2013.01); *F02K 1/48* (2013.01); *F05D 2250/314* (2013.01); *F05D 2250/37* (2013.01); *F05D 2250/71* (2013.01); *Y02T 50/60* (2013.01)

(58) Field of Classification Search
CPC .............. F02K 1/386; F02K 1/48; F02K 1/46
USPC ........................................................ 181/213
See application file for complete search history.

(56) References Cited

U.S. PATENT DOCUMENTS

| | | | |
|---|---|---|---|
| 4,045,957 A | 9/1977 | Disabato | |
| 6,606,854 B1 * | 8/2003 | Siefker | B63G 13/02 181/213 |
| 7,506,501 B2 | 3/2009 | Anderson et al. | |
| 7,810,335 B2 | 10/2010 | Dussillols et al. | |
| 7,827,802 B2 | 11/2010 | Dussillols et al. | |
| 8,104,260 B2 | 1/2012 | Girgis et al. | |
| 2006/0112675 A1 * | 6/2006 | Anderson | F02K 1/386 60/262 |
| 2008/0105488 A1 * | 5/2008 | Dussillols | F02K 1/386 181/220 |
| 2010/0199626 A1 * | 8/2010 | Harding | F02C 7/16 60/39.5 |
| 2010/0293958 A1 | 11/2010 | Girgis et al. | |

FOREIGN PATENT DOCUMENTS

WO    00/40851    7/2000

* cited by examiner

*Primary Examiner* — Thomas P Burke
(74) *Attorney, Agent, or Firm* — Norton Rose Fulbright Canada LLP (57) ABSTRACT

An exhaust mixer for a gas turbine engine where each outer lobe has at the downstream end a circumferential offset in a direction corresponding to that of the swirl component of the flow entering the mixer. The mixer has a crest line having at least a downstream portion curved with respect with respect to a circumferential direction of the mixer and/or a center line at the downstream end tilted with respect to a radial line extending to the tip of the outer lobe to define the circumferential offset. A method of mixing a core flow and a bypass flow surrounding the core flow with an annular mixer is also provided.

20 Claims, 9 Drawing Sheets

EXHAUST MIXER WITH OFFSET LOBES

TECHNICAL FIELD

The application relates generally to aircraft gas turbine engines and, more particularly, to gas turbine engine exhaust mixers.

BACKGROUND OF THE ART

In turbofan engines, high velocity air from the turbofan core is mixed with low velocity air from the bypass duct, and this mixed air is then exhausted from the engine. Turbofan engines generally use exhaust mixers in order to increase the mixing of the high and low velocity fluid flows. Various different configurations of exhaust mixers have been used in order to increase the mixing of the fluid flows.

Generally, the flow exiting the last turbine stage has significant swirl and is de-swirled by a set of de-swirling struts upstream of the mixer. At the exit of these struts there is residual swirl. Generally a straight mixer further straightens the flow at a cost of pressure losses and directs the flow so that it is essentially axial at the exit of the mixer. Some exhaust mixer configurations have also been proposed to further reduce the swirl of the engine when compared to a straight mixer, for example by providing inner lobes curved in a direction opposite to that of the swirl.

SUMMARY

In one aspect, there is provided an exhaust mixer for a gas turbine engine of the type having an annular bypass passage for channeling air from a fan flow and a main gas path passage, the exhaust mixer being adapted to receive a flow from the main gas path passage having a swirl component in a given direction, the exhaust mixer comprising: an annular wall defining a central longitudinal axis, the annular wall having opposed upstream and downstream ends and defining a plurality of circumferentially distributed alternating inner and outer lobes, with each inner lobe protruding into the main gas path passage, and each outer lobe protruding into the annular bypass passage, each outer lobe having a crest line extending substantially longitudinally through each radially outermost point of the outer lobe and a base defined between spaced apart wall portions of the outer lobe at an upstream end of the crest line, at least a downstream portion of the crest line being curved with respect to a circumferential direction of the mixer and defining at the downstream end a circumferential offset with respect to the base in a direction corresponding to that of the swirl component.

In another aspect, there is provided an exhaust mixer for a gas turbine engine of the type having an annular bypass passage for channeling air from a fan flow and a main gas path passage, the exhaust mixer being adapted to receive a flow from the main gas path passage having a swirl component in a given direction, the exhaust mixer comprising: an annular wall defining a central longitudinal axis, the annular wall defining a plurality of circumferentially distributed alternating inner and outer lobes, with each inner lobe protruding into the main gas path passage, and each outer lobe protruding into the annular bypass passage, and each outer lobe defines in a cross-section located at a downstream end thereof a center line extending at equal distance from spaced apart portions of the wall defining the outer lobe, the center line extending at a non-zero angle with respect to a radial line extending from the central longitudinal axis and intersecting the center line at a tip of the outer lobe, the center line being oriented to define a circumferential offset of the outer lobe at the downstream end relative to an upstream end thereof in a direction corresponding to that of the swirl component.

In a further aspect, there is provided a method of mixing a core flow and a bypass flow surrounding the core flow with an annular mixer having circumferentially alternating inner and outer lobes, the method comprising: circulating the core flow through the mixer and the bypass flow around the mixer; generating pairs of counter rotating radial vortices within the core flow near a tip of the outer lobes; and with the outer lobes, guiding a downstream transport of the vortices such that adjacent ones of the vortices in a same pair move along different paths defined at different radial distances from a longitudinal axis of the mixer.

DESCRIPTION OF THE DRAWINGS

Reference is now made to the accompanying figures in which.

DETAILED DESCRIPTION

Figure 1:
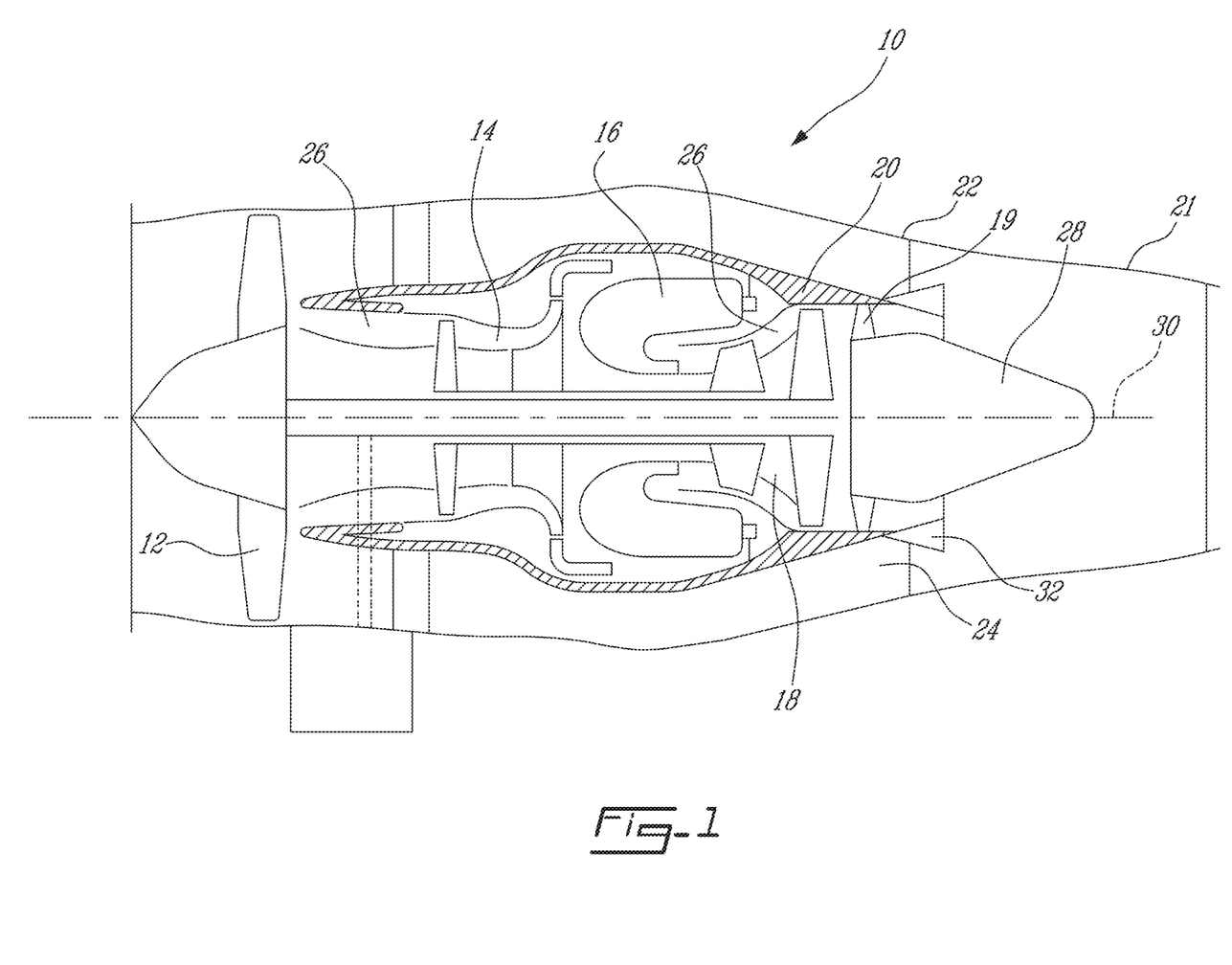
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 includes a first casing 20 which encloses the turbo machinery of the engine, and a second, outer casing 22 extending outwardly of the first casing 20 such as to define an annular bypass passage 24 therebetween. The air propelled by the fan 12 is split into a first portion which flows around the first casing 20 within the bypass passage 24, and a second portion which flows through a main gas path 26 which is defined within the first casing 20 and allows the flow to circulate through the multistage compressor 14, combustor 16 and turbine section 18 as described above.

At the aft end of the engine 10, an axisymmetrical bullet 28 is centered on a longitudinal axis 30 of the engine 10 and defines an inner wall of the main gas path 26 so that the turbine exhaust gases flow therearound. An annular mixer 32 surrounds at least a portion of the bullet 28, the mixer 32 acting as a rearmost portion of the outer wall defining the main gas path 26 and a rearmost portion of the inner wall defining the bypass passage 24. The hot gases from the main gas path 26 and the cooler air from the bypass passage 24 are thus mixed together by the mixer 32 at the exit thereof such as to produce an exhaust with a reduced temperature.

Figure 2:
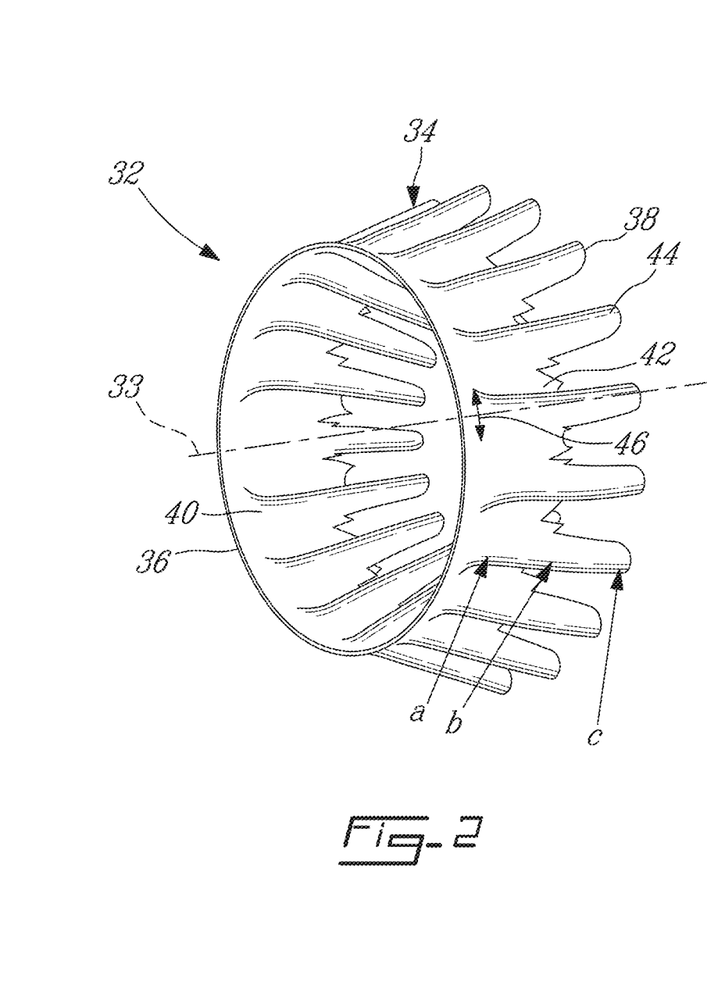
FIG. 2 is a tridimensional view of a mixer in accordance with a particular embodiment, which can be used in a gas turbine engine such as shown in FIG. 1.
Figure 3:
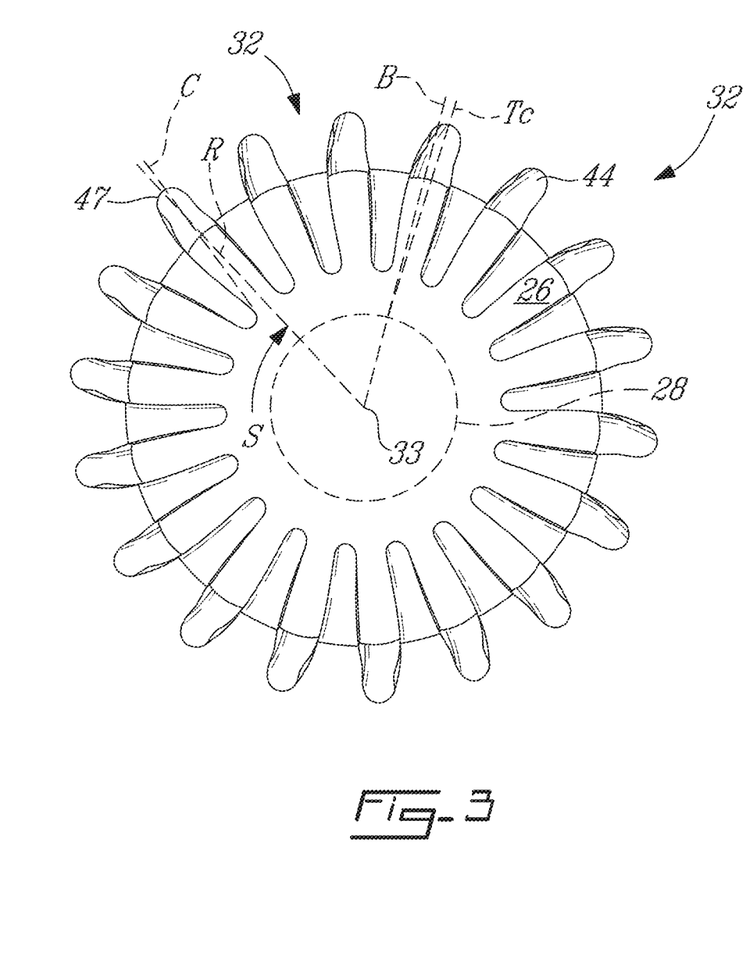
FIG. 3 is a rear view of the mixer of FIG. 2.

Referring to FIGS. 2-3, the mixer 32 has a central longitudinal axis 33 and includes an annular wall 34 defining an upstream end 36 of the mixer 32 along which the flows from the main gas path 26 and from the bypass passage 24 are received, and a downstream end 38 where the two flows meet and are mixed together. The annular wall 34 includes a frustoconical portion 40 extending from and defining the upstream end 36, the frustoconical portion 40 having a diameter progressively reducing toward the downstream end 38. The annular wall 34 also defines a plurality of circumferentially distributed lobes extending rearwardly from the frustoconical portion 40. The lobes include alternating inner and outer lobes 42, 44, with the outer lobes 44 extending into the bypass passage 24 and the inner lobes 42 extending into the main gas path 26. As such, the inner lobes 42 define troughs in the bypass passage 24 in between adjacent ones of the outer lobes 44, while the outer lobes 44 define troughs in the main gas path 26 in between adjacent ones of the inner lobes 42. In the embodiment shown, each lobe 42, 44 has a radially elongated cross-section including a rounded tip 47, and extends from the frustoconical portion 40 to the downstream end 38 of the mixer 32.

The present mixer 32 is configured to allow (e.g. maintain or increase) the swirl in the turbine exhaust flow for enhanced mixing. In a particular embodiment, the mixer 32 allows for improved aerodynamic performance relative to a straight mixer design.

Figure 4:
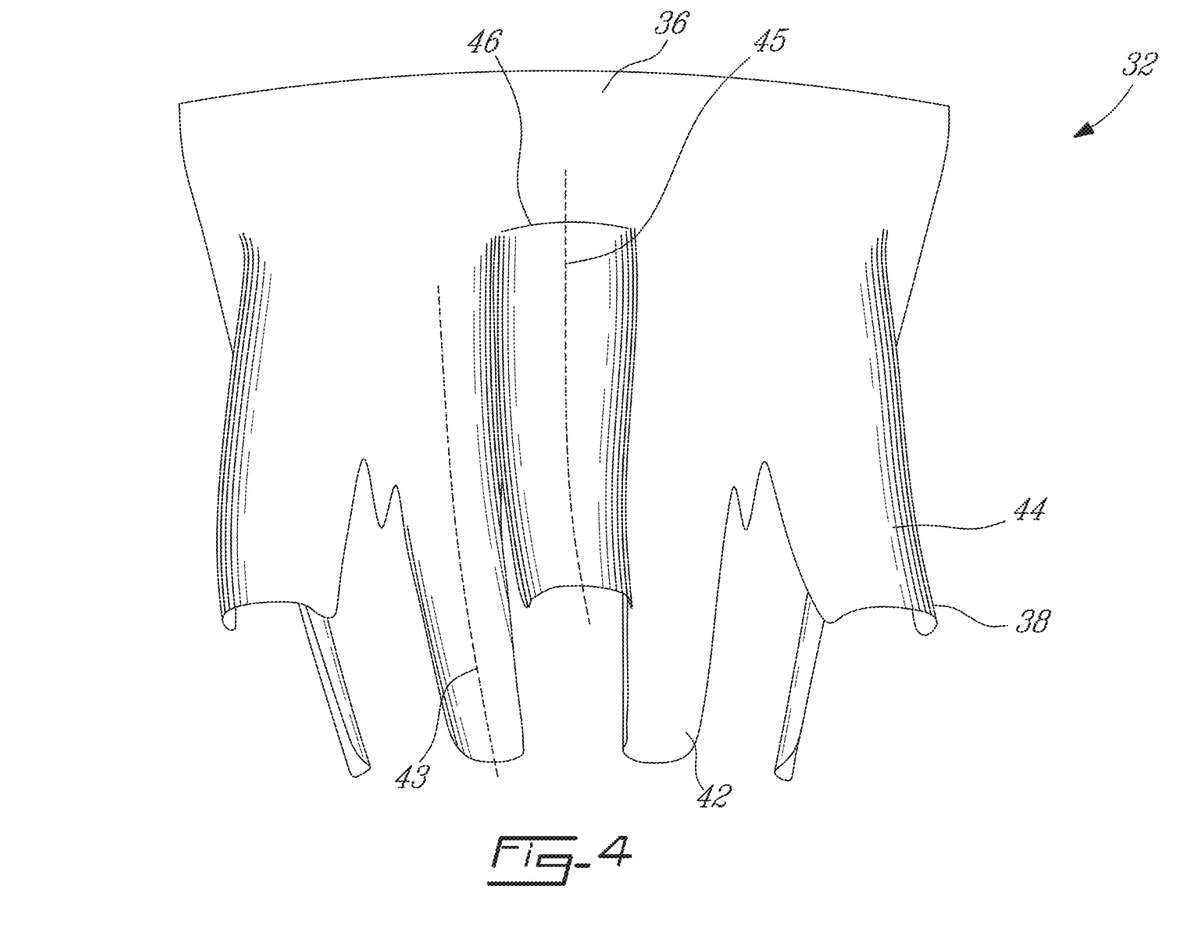
FIG. 4 is a top tridimensional view of part of the mixer of FIG. 2.

Referring to FIG. 4, each inner lobe 42 defines an imaginary valley line 43 extending substantially longitudinally through its radially innermost points. Each outer lobe 44 defines an imaginary crest line 45 extending longitudinally or substantially longitudinally through its radially outermost points. In a typical straight mixer, each crest line and each valley line extends longitudinally. In the embodiment shown in FIG. 4, the crest lines 45 and, optionally, the valley lines 43 are curved with respect to a circumferential direction of the mixer 32; in other words, the crest lines 45 and, optionally, the valley lines 43, have a curved shape when viewed in a respective direction which in a conventional straight mixer would superpose the crest line 45/valley line 43 with the longitudinal axis 33. The crest lines 45 are curved such as to define a circumferential offset with respect to the longitudinal axis 33 in the same direction as that of the swirl, as will be detailed further below.

In a particular embodiment, the path of the curved crest lines 45 and valley lines 43 are obtained from a straight mixer configuration through circumferentially twisting the crest lines 45 and valley lines 43 about the longitudinal axis 33. The circumferential twist of the crest lines 45 may be the same or different from that of the valley lines 43. In another embodiment, the path of the curved crest lines 45 is obtained from a straight mixer configuration through pivoting of each crest line 45 about a respective pivot point located on a circle extending through the valley lines 43. Alternately, any other type of curvature that deflects the crest lines 45 and optionally, the valley lines 43 in the circumferential direction may be used. The valley lines 43 may be deflected in the same or in an opposite direction as that of the crest lines 45.

The crest lines 45 and, optionally, the valley lines 43 may be deflected at a constant rate along the longitudinal direction of the mixer 32, or alternately, the rate of deflection may vary along the longitudinal direction.

The crest lines 45 and, optionally, the valley lines 43 can be deflected along only a downstream portion thereof, such that the outer lobes 44 and, optionally, the inner lobes 42 extend straight from the upstream end 36 up to location intermediate the upstream and downstream ends 36, 38 and then are circumferentially deflected between that location and the downstream end 38. In another embodiment, the crest lines 45 and, optionally, the valley lines 43 are deflected along their entire length.

Figure 5:
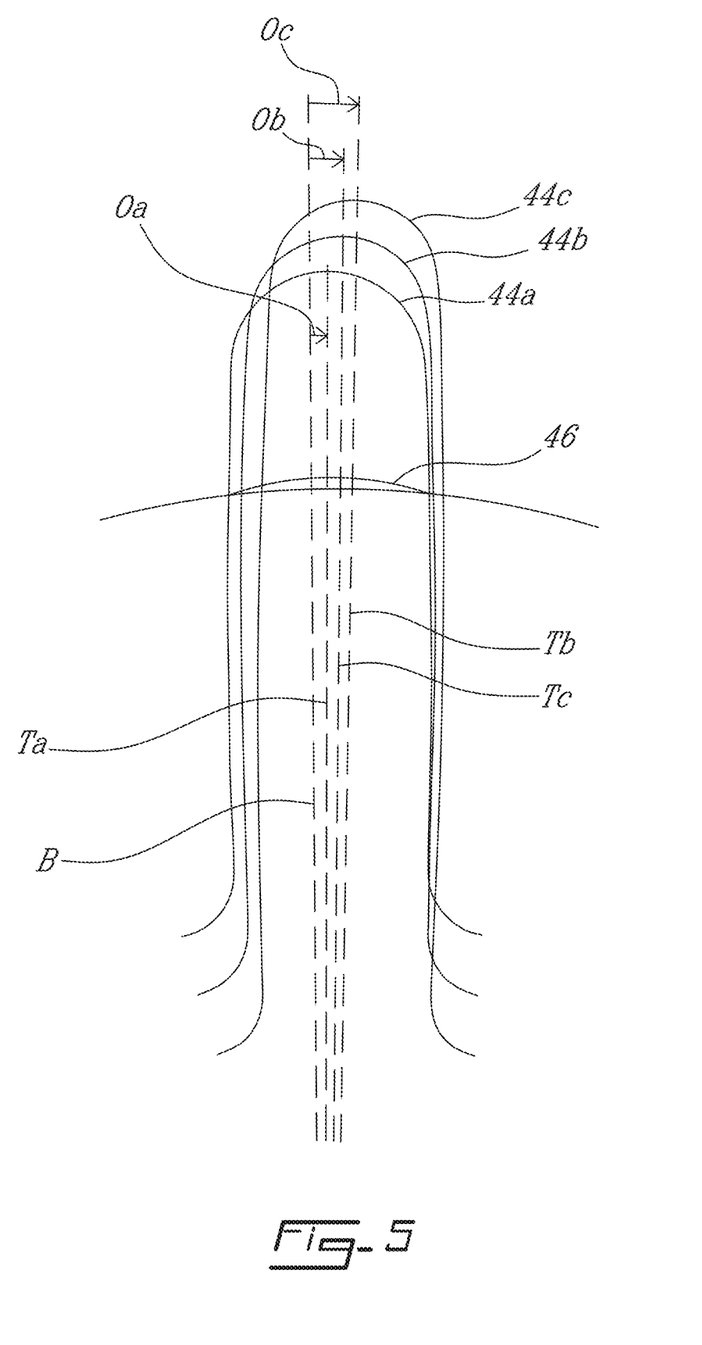
FIG. 5 shows in superposition three cross-sections of a same outer lobe within different planes defined along the length of the mixer of FIG. 2.

Referring to FIG. 5, three (3) cross-sections of a same outer lobe 44 are shown, with each cross-section being located in a respective plane extending perpendicularly to the longitudinal axis 33, at the locations a, b, c shown in FIG. 2. Cross section 44c is located in a plane at the downstream end 38 of the mixer 32, cross-section 44a is located in a plane closer to the upstream end 36, and cross-section 44b is located in a plane between that of cross-sections 44a and 44c. Each outer lobe 44 includes a base 46 which is defined adjacent the frustoconical portion 40, at the upstream end of the crest line 45.

At the downstream end 38 of the mixer 32, illustrated by cross-section 44c, the crest line 45 of each outer lobe 44 is circumferentially offset with respect to the base 46. It can be seen that an imaginary radial tip line Tc extending from the central longitudinal axis 33 to the crest line 45 is circumferentially offset from an imaginary radial base line B extending from the central longitudinal axis 33 to a midpoint of the base 46. The direction of the circumferential offset Oc from the base line B to the tip line Tc corresponds to the direction of the swirl S of the turbine exhaust flow entering the mixer 32. In a particular embodiment, the offset angle Oc at the downstream end 38 is at most 5°. In a particular embodiment, the offset angle Oc at the downstream end 38 is at most 2°. In a particular embodiment, the offset angle Oc at the downstream end 38 end is at least 0.5°.

In the embodiment shown, the circumferential offset of the outer lobes 44 becomes progressively more pronounced toward the downstream end 38 of the mixer 32. Accordingly, the offset angle Oa from the radial base line B to the radial tip line Ta of the cross-section 44a closest to the upstream end 36 is smaller than the offset angle Ob from the radial base line B to the radial tip line Tb of the intermediary cross-section 44b, which is smaller than the offset angle Oc at the downstream end 38.

In the embodiment shown and with reference to FIG. 3, each outer lobe 44 in cross-section defines an imaginary center line extending at equal distance from the wall portions defining the outer lobe 44, illustrated at C for the downstream end 38 in FIG. 3. In the embodiment shown, it can be seen that the center line C at the downstream end 38 is angled (i.e. extends at a non-zero angle) with respect to an imaginary radial line R extending from the longitudinal axis 33 and intersecting the center line C at the center of the tip 47; the outer lobe 44 is thus tilted with respect to the radial direction R. In the embodiment shown, each outer lobe 44 has a straight center line C and is symmetrical with respect thereto. Alternately, the center line C and wall portions forming the outer lobes 44 may be curved and/or the outer lobe 44 may be asymmetrical about the center line C.

Figure 6:
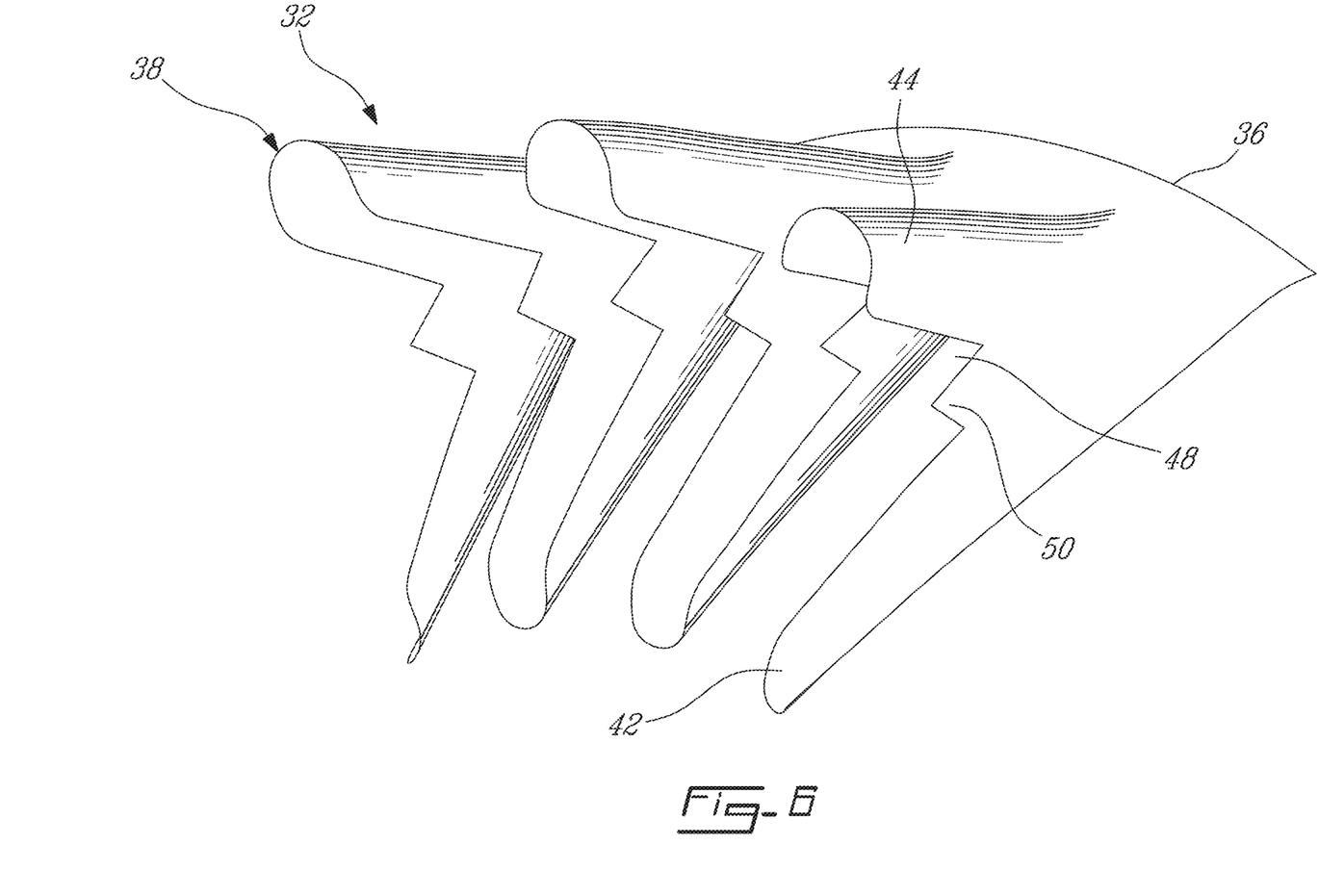
FIG. 6 is a side, rear perspective view of part of the mixer of FIG. 2.
Figure 8:
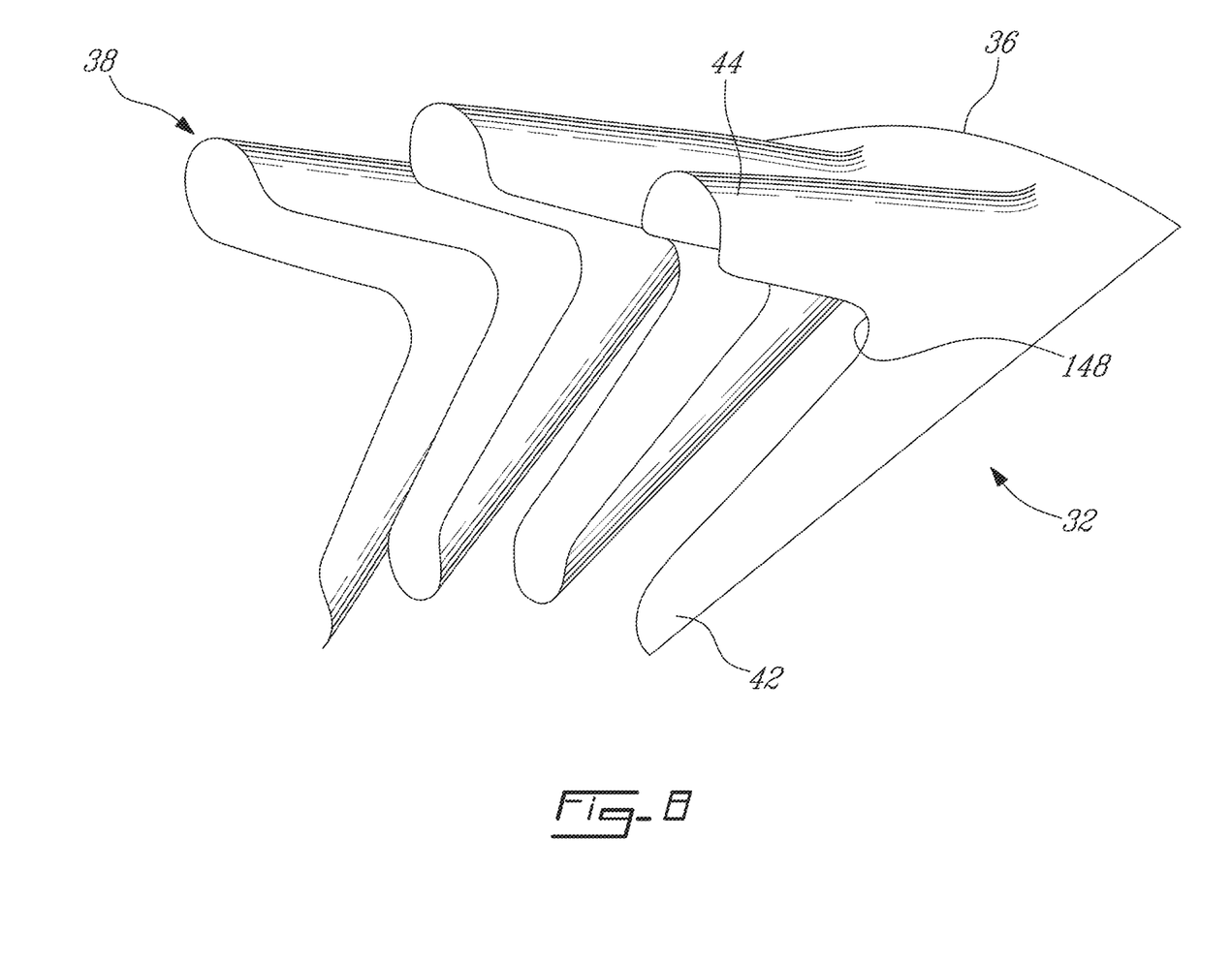
FIG. 8 is a side, rear perspective view of part of a mixer in accordance with another particular embodiment.

Referring to FIG. 6, in a particular embodiment, the trailing edge junction of each outer lobe 44 with the adjacent inner lobes 42 defines a scallop 48, from which extends a pointed tab 50. In another particular embodiment shown in FIG. 8, the trailing edge junction of each outer lobe 44 with the adjacent inner lobes 42 defines only a scallop 148. Any other adequate trailing edge treatment may alternately be used, for example a tabbed trailing edge.

Figure 7:
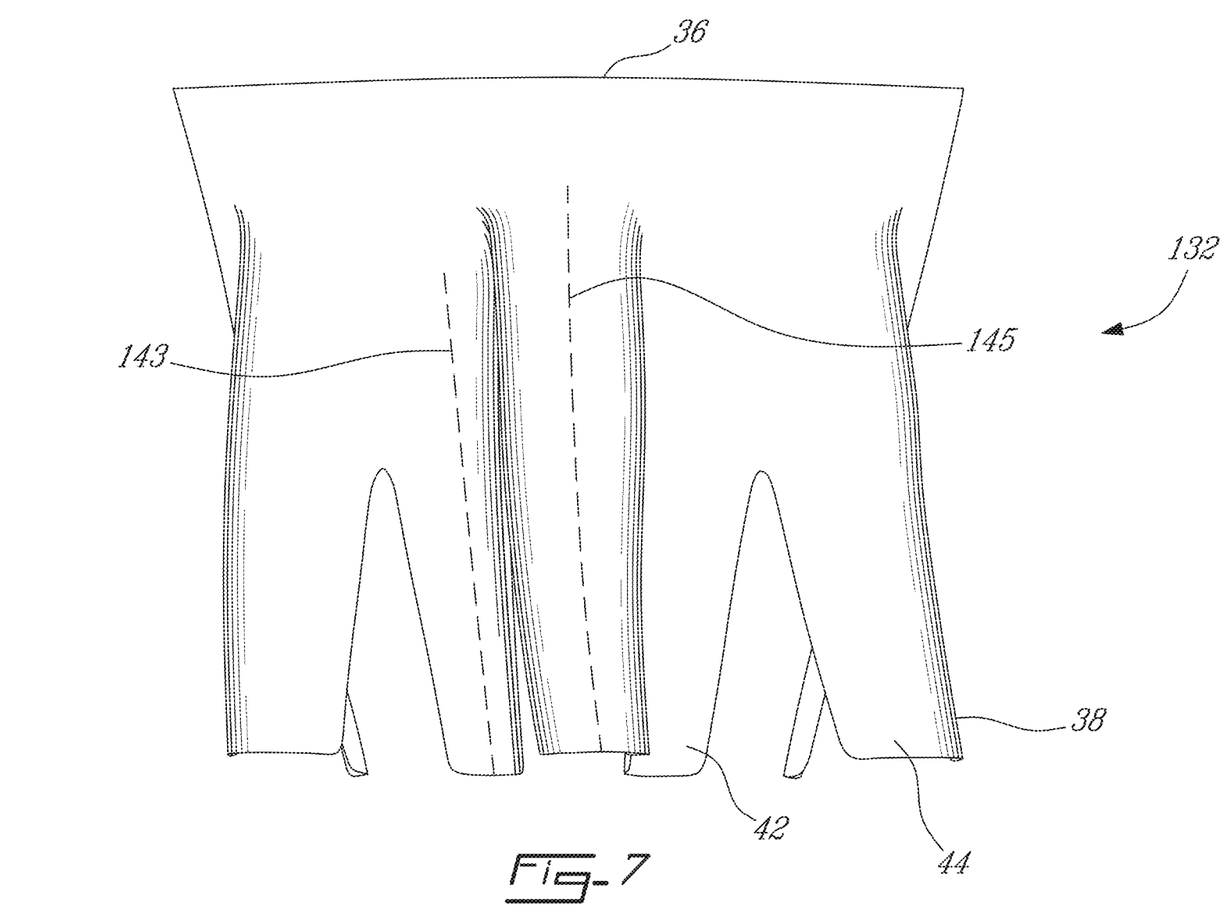
FIG. 7 is a top tridimensional view of part of a mixer in accordance with another particular embodiment.

FIG. 7 shows an alternate embodiment for the mixer 132 where the crest lines 145 are curved relative to the longitudinal direction and where the valley lines 143 are straight. In a particular embodiment, the valley lines 143 are coplanar with the longitudinal axis, such that the inner lobes 42 are straight and longitudinal. In a particular embodiment, the path of the curved crest lines 145 is obtained through pivoting of each crest line 145 about a respective pivot point located on a circle extending through the valley lines 143.

Figure 9A:
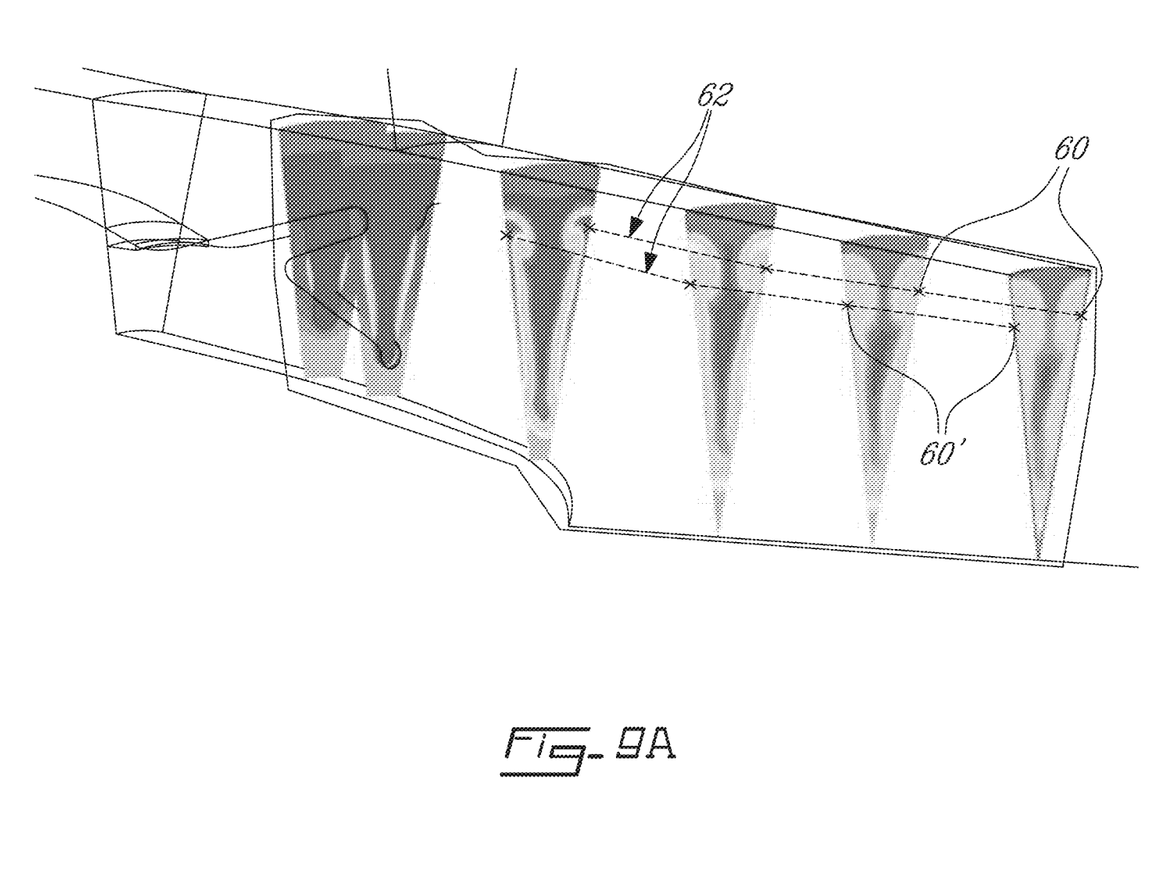
FIG. 9A is a tridimensional schematic representations of vortices in an outer lobe of a straight mixer.

In use, the turning of the outer lobe 44 through circumferential deflection of the crest line 45, 145 changes the trajectory of the crest vortex pair such that the centres of the vortices are at different radii. Referring to FIG. 9A, in a conventional mixer with straight longitudinal lobes, the mixing is achieved through radial vortices generated in the shear layer and pairs of counter rotating vortices generated by the core flow penetrating into the cold flow at the lobe crest and that are transported downstream symmetrically or substantially symmetrically (a small amount of residual swirl may prevent the flow from being exactly symmetrical). The centers 60, 60' of the pair of vortices are transported downstream symmetrically along a path 62 located at a same radial distance from the longitudinal axis 33.

Figure 9B:
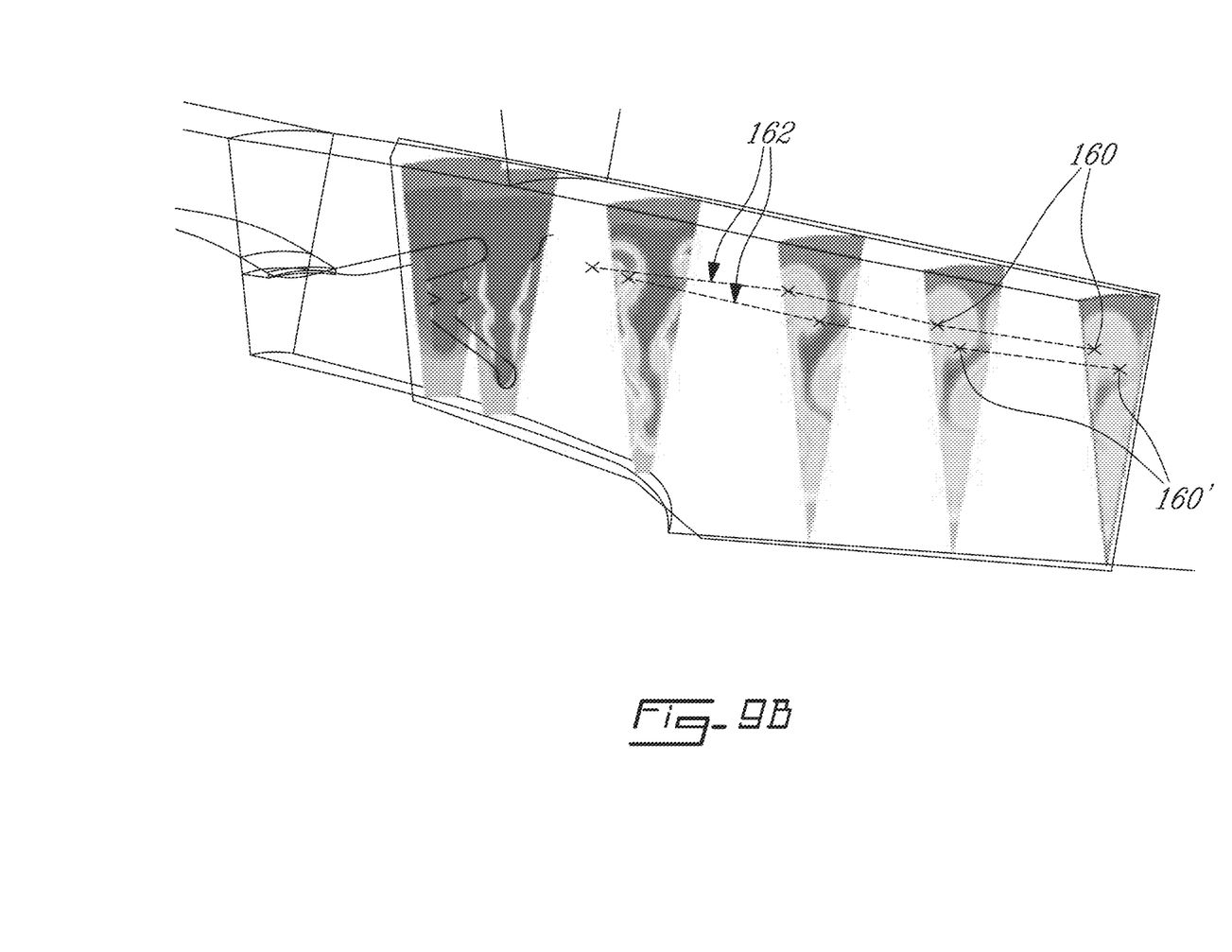
FIG. 9B is a tridimensional schematic representation of vortices in an outer lobe of a mixer according to a particular embodiment.

In a particular embodiment, and referring to FIG. 9B, the offset of the outer lobes 44 changes the trajectory of the pairs of vortices such that the centers of adjacent vortices 160, 160' migrate to paths 162 defined at different radii. Because of the shift in radii, the span of radius over which the vortices have an effect is increased, increasing mixing. In addition, the two adjacent vortices of consecutive lobes are also at different radii which increase their interaction resulting in more cold flow between consecutive lobes being involved in the mixing process. Finally, the interactions of the vortices with the shear layer formed by the mixer side walls result in the shear layer deforming and increasing its surface area, further increasing the mixing area.

Generally, turning the flow is known to increase pressure losses due to the resulting secondary flows generated. In a particular embodiment, the configuration offset outer lobes 44 (and optionally, offset inner lobes 42) result in an increase in the mixing downstream of the mixer 32, 132 without or with a limited increase in pressure loss. This may provide an increase in thrust coefficient over a straight mixer at the same engine condition, resulting in a reduction in specific fuel consumption.

In a particular embodiment and as mentioned above, the minimum turn or offset angle to turn the flow sufficiently to cause the radial migration is 0.5°. In a particular embodiment, the upper limit for the offset angle is determined such as to limit the pressure losses. In a particular embodiment, the maximum offset angle is 2°. In another particular embodiment, the maximum offset angle is 5°. An offset angle that is too high may lead to an increase in lossed in the mixer and nozzle high enough to reduce the resulting thrust coefficient, which may cause an increase in specific fuel consumption instead of the desired reduction. Losses in the mixer and nozzle may include bypass loss (loss incurred from the outer lobe leading edge to the mixer trailing edge), core loss (loss incurred from the inner lobe leading edge to the mixer trailing edge) and/or mixing pressure loss (loss incurred from the mixer trailing edge to the nozzle exit).

In a particular embodiment, the improved mixing of the mixer 32, 132 is achieved by increasing the area of the shear layer between the core and bypass streams over which the two flows can mix, as compared with a straight mixer at the same engine condition. In a particular embodiment, the improved mixing is achieved by adding a rotational component to the flow downstream of the mixer 32, 132 that causes additional interaction of the vortices generated by the mixer 32, 132.

In a particular embodiment, the mixer 32, 132 enhances the interaction of a low level of residual swirl in the core and bypass flow with the mixing flow structures, which results in residual swirl increasing performance. This is contrary to a straight mixer for which residual swirl is generally a performance penalty. In a particular embodiment, the mixer 32, 132 allows for a higher allowable residual swirl with the benefit that the amount of deswirling required downstream of the low pressure turbine is reduced, lowering the loss of the turbine exhaust case. De-swirling TEC struts 19 (see FIG. 1) leaving some residual swirl may thus be used upstream of the mixer 32, 132.

A limiting factor of mixer design may be avoidance of hot gas impingement on a nozzle wall 21 (see FIG. 1) downstream of the mixer, as nozzles are often made from composite material with temperature capabilities below the temperature of the hot gas. The degree of impingement is a function of the degree of penetration of the outer lobes into the cold flow. In a conventional straight mixer, the area of mixing may be increased by increasing penetration, but the hot gas impingement on the nozzle wall limits the possible increase in penetration and as such the possible performance improvement. In a particular embodiment, the offset outer lobes 44 of the mixer 32, 132 allow for an increased area of the shear layer of mixing when compared to a straight mixer having the same penetration, thus allowing a higher level of mixing to be achieved without impinging on the downstream nozzle. The mixer 32, 132 may be used in combination with a straight or canted nozzle, i.e. nozzle having an exit centerline not in line with the longitudinal axis 33.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An exhaust mixer for a gas turbine engine of the type having an annular bypass passage for channeling air from a fan flow and a main gas path passage, the exhaust mixer being adapted to receive a flow from the main gas path passage having a swirl component in a given direction, the exhaust mixer comprising:

an annular wall defining a central longitudinal axis, the annular wall having opposed upstream and downstream ends and defining a plurality of circumferentially distributed alternating inner and outer lobes, with
each inner lobe protruding into the main gas path passage, and
each outer lobe protruding into the annular bypass passage, each outer lobe having a crest line extending substantially longitudinally through each radially outermost point of the outer lobe and a base defined between spaced apart wall portions of the outer lobe at an upstream end of the crest line, at least a downstream portion of the crest line being curved with respect to a circumferential direction of the mixer and defining a circumferential offset with respect to the base, the downstream end being circumferentially offset from the base by an angle of at most 5 degrees and the circumferential offset being defined in a same direction as that of the swirl component, the circumferential offset adapted to maintain or increase the swirl component, the circumferential offset increasing progressively along the downstream portion of the crest line from the base to a largest circumferential offset at the downstream end.

2. The exhaust mixer as defined in claim 1, wherein in a cross-section located at the downstream end, each outer lobe defines a center line extending at equal distance from the spaced apart wall portions defining the outer lobe, the center line extending at a non-zero angle with respect to a radial line extending from the longitudinal axis and intersecting the center line at the tip of the outer lobe.

3. The exhaust mixer as defined in claim 2, wherein each outer lobe is symmetrical about the center line at the downstream end.

4. The exhaust mixer as defined in claim 1, wherein the circumferential offset at the downstream end is at most 2 degrees.

5. The exhaust mixer as defined in claim 1, wherein the circumferential offset at the downstream end is at least 0.5 degrees.

6. The exhaust mixer as defined in claim 1, wherein each crest line is curved along an entire length thereof.

7. The exhaust mixer as defined in claim 1, wherein each inner lobe defines a valley line extending substantially longitudinally through each radially innermost point of the inner lobe, at least a downstream portion of the valley line being curved with respect to the circumferential direction of the mixer.

8. The exhaust mixer as defined in claim 7, wherein each crest line and each valley line are curved along an entire length thereof.

9. The exhaust mixer as defined in claim 1, wherein each inner lobe defines a valley line extending substantially longitudinally through each radially innermost point of the inner lobe, each valley line being coplanar with the longitudinal axis.

10. The exhaust mixer as defined in claim 1, wherein a path of each crest line corresponds to a circumferential twist about the central longitudinal axis.

11. The exhaust mixer as defined in claim 1, wherein each inner lobe defines a valley line extending substantially longitudinally through each radially innermost point of the inner lobe, and wherein a path of each crest line corresponds to a pivot about a respective pivot point located on a perimeter of a same imaginary circle extending through each valley line.

12. An exhaust mixer for a gas turbine engine of the type having an annular bypass passage for channeling air from a fan flow and a main gas path passage, the exhaust mixer being adapted to receive a flow from the main gas path passage having a swirl component in a given direction, the exhaust mixer comprising:
an annular wall defining a central longitudinal axis, the annular wall defining a plurality of circumferentially distributed alternating inner and outer lobes, with
each inner lobe protruding into the main gas path passage, and
each outer lobe protruding into the annular bypass passage and defining in a cross-section located at a downstream end thereof a center line extending at equal distance from spaced apart portions of the wall defining the outer lobe, the center line extending at a non-zero angle with respect to a radial line extending from the central longitudinal axis and intersecting the center line at a tip of the outer lobe, the center line being oriented to define a circumferential offset of the outer lobe at the downstream end relative to an upstream end thereof, the circumferential offset being defined in a same direction as that of the swirl component, the circumferential offset adapted to maintain or increase the swirl component,
wherein each outer lobe has a crest line extending substantially longitudinally through each radially outermost point of the outer lobe, the crest line having a downstream end at the downstream end of the mixer and an opposed upstream end, the upstream and downstream ends of the crest line defining a circumferential offset therebetween, the downstream end of the crest line being circumferentially offset from the upstream end of the crest line by an angle of at most 5 degrees, the circumferential offset increasing progressively along the crest line from the upstream end thereof to a largest circumferential offset at the downstream end of the crest line.

13. The exhaust mixer as defined in claim 12, wherein the center line is straight and the outer lobe is symmetrical about the center line at the downstream end.

14. The exhaust mixer as defined in claim 12, wherein at least a downstream portion of the crest line is curved with respect to a circumferential direction of the mixer.

15. The exhaust mixer as defined in claim 12, wherein the circumferential offset at the downstream end is at most 2 degrees.

16. The exhaust mixer as defined in claim 12, wherein the circumferential offset at the downstream end is at least 0.5 degrees.

17. A method of mixing a core flow having a swirl component and a bypass flow surrounding the core flow with an annular mixer having circumferentially alternating inner and outer lobes, the method comprising:
circulating the bypass flow around the mixer; and
circulating the core flow through the mixer in the outer lobes defining a twist in a same direction as that of the swirl component, wherein each outer lobe has a crest line extending substantially longitudinally and the twist defines a circumferential offset between opposed upstream and downstream ends of the crest line so that the downstream end is circumferentially offset from the upstream end by an angle of at most 5 degrees, the circumferential offset maintaining or increasing the swirl component, the circumferential offset increasing progressively along all points of the crest line, including:
generating pairs of counter rotating radial vortices within the core flow near a tip of the outer lobes; and
with the outer lobes, guiding a downstream transport of the vortices such that adjacent ones of the vortices in a same pair move along different paths defined at different radial distances from a longitudinal axis of the mixer.

18. The method as defined in claim 17, further comprising, with the outer lobes, guiding the downstream transport of the vortices such that adjacent ones of the vortices in adjacent ones of the outer lobes move along paths defined at different radial distances from the longitudinal axis.

19. The exhaust mixer as defined in claim 1, wherein each outer lobe extends straight from the upstream end to the downstream portion.

20. The exhaust mixer as defined in claim 12, wherein each outer lobe extends straight from the upstream end to the downstream portion.

* * * * *